US012347669B2

(12) United States Patent
Sasaki

(10) Patent No.: US 12,347,669 B2
(45) Date of Patent: Jul. 1, 2025

(54) FLASH LAMP

(71) Applicant: HAMAMATSU PHOTONICS K.K., Hamamatsu (JP)

(72) Inventor: Tatsuaki Sasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/293,844

(22) PCT Filed: Jun. 17, 2022

(86) PCT No.: PCT/JP2022/024364
§ 371 (c)(1),
(2) Date: Jan. 31, 2024

(87) PCT Pub. No.: WO2023/026650
PCT Pub. Date: Mar. 2, 2023

(65) Prior Publication Data
US 2024/0331997 A1 Oct. 3, 2024

(30) Foreign Application Priority Data
Aug. 26, 2021 (JP) ................................ 2021-138264

(51) Int. Cl.
*H01J 61/06* (2006.01)

(52) U.S. Cl.
CPC .................................. *H01J 61/06* (2013.01)

(58) Field of Classification Search
CPC ....................................................... H01J 61/06
See application file for complete search history.

(56) References Cited

U.S. PATENT DOCUMENTS

2012/0043883 A1* 2/2012 Yamashita .............. H01J 61/90 313/581
2021/0358735 A1* 11/2021 Hasegawa ............... H01J 61/90

FOREIGN PATENT DOCUMENTS

JP S62-281250 A 12/1987
JP S63-054248 U 4/1988
JP H4-106832 A 4/1992
JP H8-124521 A 5/1996
JP 2006-120358 A 5/2006
(Continued)

OTHER PUBLICATIONS

English Machine Translation of Hasegawa JP 6637569 (Year: 2024).*
International Preliminary Report on Patentability mailed Mar. 7, 2024 for PCT/JP2022/024364.

*Primary Examiner* — Donald L Raleigh
(74) *Attorney, Agent, or Firm* — Faegre Drinker Biddle & Reath LLP

(57) ABSTRACT

A flash lamp includes a housing having a stem, a first conductive linear member extending so as to penetrate the stem, and a second conductive linear member extending so as to penetrate the stem. The first conductive linear member includes a first lead portion and a first electrode portion provided at a tip of the first lead portion. The second conductive linear member includes a second lead portion and a second electrode portion provided at a tip of the second lead portion. The first electrode portion includes a first protruding portion protruding into an internal space, and a first buried portion buried in the stem. The second electrode portion includes a second protruding portion protruding into the internal space, and a second buried portion buried in the stem.

11 Claims, 11 Drawing Sheets

(56) References Cited

FOREIGN PATENT DOCUMENTS

| | | | | |
|---|---|---|---|---|
| JP | 2006-302575 A | 11/2006 | | |
| JP | 2007-287534 A | 11/2007 | | |
| JP | 6097437 B2 | 3/2017 | | |
| JP | 6637569 B1 * | 1/2020 | ............ | H01J 61/073 |
| JP | 2020-064752 A | 4/2020 | | |

* cited by examiner

FLASH LAMP

TECHNICAL FIELD

The present disclosure relates to a flash lamp.

BACKGROUND ART

There is known a flash lamp which generates a large amount of pulsed light by instantaneously discharging electric power (see, for example, Patent Document 1). In the flash lamp disclosed in Patent Document 1, two lead pins extend so as to penetrate a stem, and an electrode portion provided at the tip of each lead pin has a larger diameter than the lead pin, so that discharge is performed between the two electrode portions.

CITATION LIST

Patent Literature

Patent Document 1: Japanese Patent No. 6637569

SUMMARY OF INVENTION

Technical Problem

Further stabilization of light output is desired in the art.

The present disclosure describes a flash lamp capable of stabilizing the light output.

Solution to Problem

A flash lamp according to one aspect of the present disclosure includes: a housing having a stem and defining an internal space; a first conductive linear member extending so as to penetrate the stem in a first direction; and a second conductive linear member extending so as to penetrate the stem in the first direction and spaced apart from the first conductive linear member in a second direction intersecting the first direction. The first conductive linear member includes a first lead portion and a first electrode portion provided at a tip of the first lead portion. The second conductive linear member includes a second lead portion and a second electrode portion provided at a tip of the second lead portion. A cross-sectional area of the first electrode portion intersecting the first direction is different from a cross-sectional area of the first lead portion intersecting the first direction. A cross-sectional area of the second electrode portion intersecting the first direction is different from a cross-sectional area of the second lead portion intersecting the first direction. The first electrode portion includes a first protruding portion protruding from the stem into the internal space, and a first buried portion connected to the tip of the first lead portion and buried in the stem. The second electrode portion includes a second protruding portion protruding from the stem into the internal space, and a second buried portion connected to the tip of the second lead portion and buried in the stem.

In the flash lamp, the first electrode portion of the first conductive linear member is provided at the tip of the first lead portion, and the tip of the first lead portion is connected to the first buried portion buried in the stem. Therefore, the first lead portion is not exposed in the internal space. Similarly, the second electrode portion of the second conductive linear member is provided at the tip of the second lead portion, and the tip of the second lead portion is connected to the second buried portion buried in the stem. Therefore, the second lead portion is not exposed in the internal space. As described above, since neither the first lead portion nor the second lead portion is exposed in the internal space of the housing, discharge does not occur between the first lead portion and the second lead portion. Therefore, discharge can be reliably generated between the first protruding portion of the first electrode portion and the second protruding portion of the second electrode portion. As a result, fluctuations in the discharge path can be suppressed, and the light output can be stabilized.

In the above-described flash lamp, the stem may include a first surface facing the internal space and a second surface opposite to the first surface in the first direction. A distance between the first protruding portion and the second protruding portion in the second direction may be shortest on the first surface. Thus, since the distance between the portion of the first protruding portion in contact with the first surface and the portion of the second protruding portion in contact with the first surface is the shortest, discharge is most likely to occur in the direction along the first surface of the stem. As a result, the discharge path is stabilized, so that the light output can be stabilized.

In the above-described flash lamp, the first protruding portion may have a shape approaching the second protruding portion toward the first surface. Thus, the distance between the first protruding portion and the second protruding portion decreases toward the first surface. Therefore, the discharge between the first protruding portion and the second protruding portion is most likely to occur in the direction along the first surface of the stem, and the discharge is less likely to occur in a portion of the first protruding portion farther from the stem in the first direction. Therefore, the discharge path is less likely to fluctuate in the first direction. As a result, the discharge path is stabilized, so that the light output can be stabilized.

In the above-described flash lamp, the second protruding portion may have a shape approaching the first protruding portion toward the first surface. Thus, the distance between the first protruding portion and the second protruding portion decreases toward the first surface. Therefore, the discharge between the first protruding portion and the second protruding portion is most likely to occur in the direction along the first surface of the stem, and the discharge is less likely to occur in a portion of the second protruding portion farther from the stem in the first direction. Therefore, the discharge path is less likely to fluctuate in the first direction. As a result, the discharge path is stabilized, so that the light output can be stabilized.

In the above-described flash lamp, the first electrode portion may have a spherical shape. In this case, the first electrode portion is a rotating body centered on the axis of the first conductive linear member. Therefore, the first conductive linear member can be fixed to the stem without considering the angle of the rotational direction around the axis of the first conductive linear member. Therefore, the arrangement of the first electrode portion can be simplified.

In the above-described flash lamp, the first electrode portion may have a conical shape. In this case, the first electrode portion is a rotating body centered on the axis of the first conductive linear member. Therefore, the first conductive linear member can be fixed to the stem without considering the angle of the rotational direction around the axis of the first conductive linear member. Therefore, the arrangement of the first electrode portion can be simplified.

In the above-described flash lamp, a length of the first protruding portion in the first direction may be equal to or shorter than a length in the first direction of a discharge path formed between the first protruding portion and the second protruding portion. A length of the second protruding portion in the first direction may be equal to or shorter than the length of the discharge path in the first direction. Since the discharge occurs between the first protruding portion and the second protruding portion, the range in which the discharge can occur in the first direction is limited by the length of the first protruding portion in the first direction and the length of the second protruding portion in the first direction. According to the above-described configuration, it is possible to suppress fluctuation of the discharge path in the first direction between the first protruding portion and the second protruding portion. As a result, the discharge path is stabilized, so that the light output can be stabilized.

The above-described flash lamp may further include a third conductive linear member extending so as to penetrate the stem in the first direction. The third conductive linear member may include a third lead portion and a sparker portion provided at a tip of the third lead portion. The sparker portion may include a third protruding portion protruding from the stem into the internal space. The first electrode portion may be a cathode, and the second electrode portion may be an anode. The first protruding portion may be disposed between the second protruding portion and the third protruding portion in the second direction. As a result, the preliminary discharge is performed between the third protruding portion and the first protruding portion, so that the discharge can be stably performed between the first protruding portion and the second protruding portion.

In the above-described flash lamp, a distance between the first protruding portion and the third protruding portion in the second direction may be shorter than a distance between the first protruding portion and the second protruding portion in the second direction. Therefore, the preliminary discharge between the first protruding portion and the third protruding portion is likely to occur earlier than the discharge between the first protruding portion and the second protruding portion. As a result, the discharge can be stably performed between the first protruding portion and the second protruding portion.

The above-described flash lamp may further include a fourth conductive linear member extending so as to penetrate the stem in the first direction. The fourth conductive linear member may include a fourth lead portion and a trigger probe portion provided at a tip of the fourth lead portion. The trigger probe portion may include a fourth protruding portion protruding from the stem into the internal space. The fourth protruding portion may be disposed between the first protruding portion and the second protruding portion in the second direction. Therefore, the preliminary discharges occur between the first protruding portion and the fourth protruding portion, and between the fourth protruding portion and the second protruding portion. Then, the main discharge occurs between the first protruding portion and the second protruding portion in the same discharge path as the preliminary discharges. As a result, the discharge path is stabilized, so that the light output can be stabilized.

In the above-described flash lamp, a length of the fourth protruding portion in the first direction may be equal to or shorter than any of a length of the first protruding portion in the first direction and a length of the second protruding portion in the first direction. Thus, the fluctuation of the discharge path in the first direction can be suppressed when the discharge occurs between the first protruding portion and the fourth protruding portion. Similarly, the fluctuation of the discharge path in the first direction can be suppressed when the discharge occurs between the second protruding portion and the fourth protruding portion. As a result, the discharge path is stabilized, so that the light output can be stabilized.

Advantageous Effects of Invention

According to the present disclosure, the light output of the flash lamp can be stabilized.

BRIEF DESCRIPTION OF DRAWINGS

FIG. 8(*c*) is a plan view of the conductive linear member shown in FIG. 8(*b*).

DESCRIPTION OF EMBODIMENTS

Figure 1:
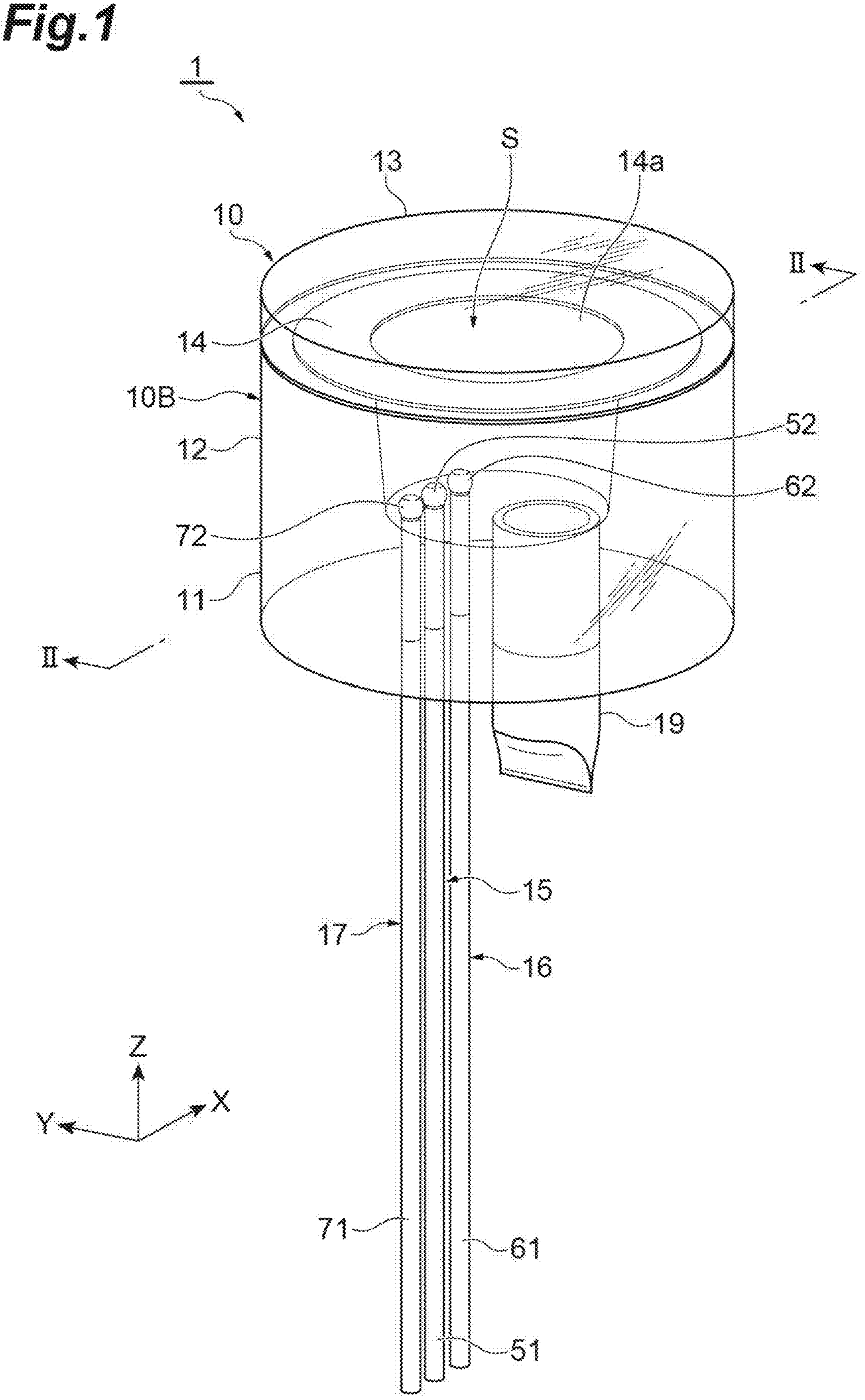
FIG. 1 is a perspective view of a flash lamp according to an embodiment.

Hereinafter, embodiments of the present disclosure will be described in detail with reference to the drawings. In the drawings, the same or corresponding parts are denoted by the same reference numerals, and redundant description will be omitted. The XYZ coordinate system is shown in each figure. The Y direction is a direction intersecting (here, orthogonal to) the X direction (second direction) and the Z direction (first direction). The Z direction is a direction intersecting (here, orthogonal to) the X direction and the Y direction.

Figure 2:
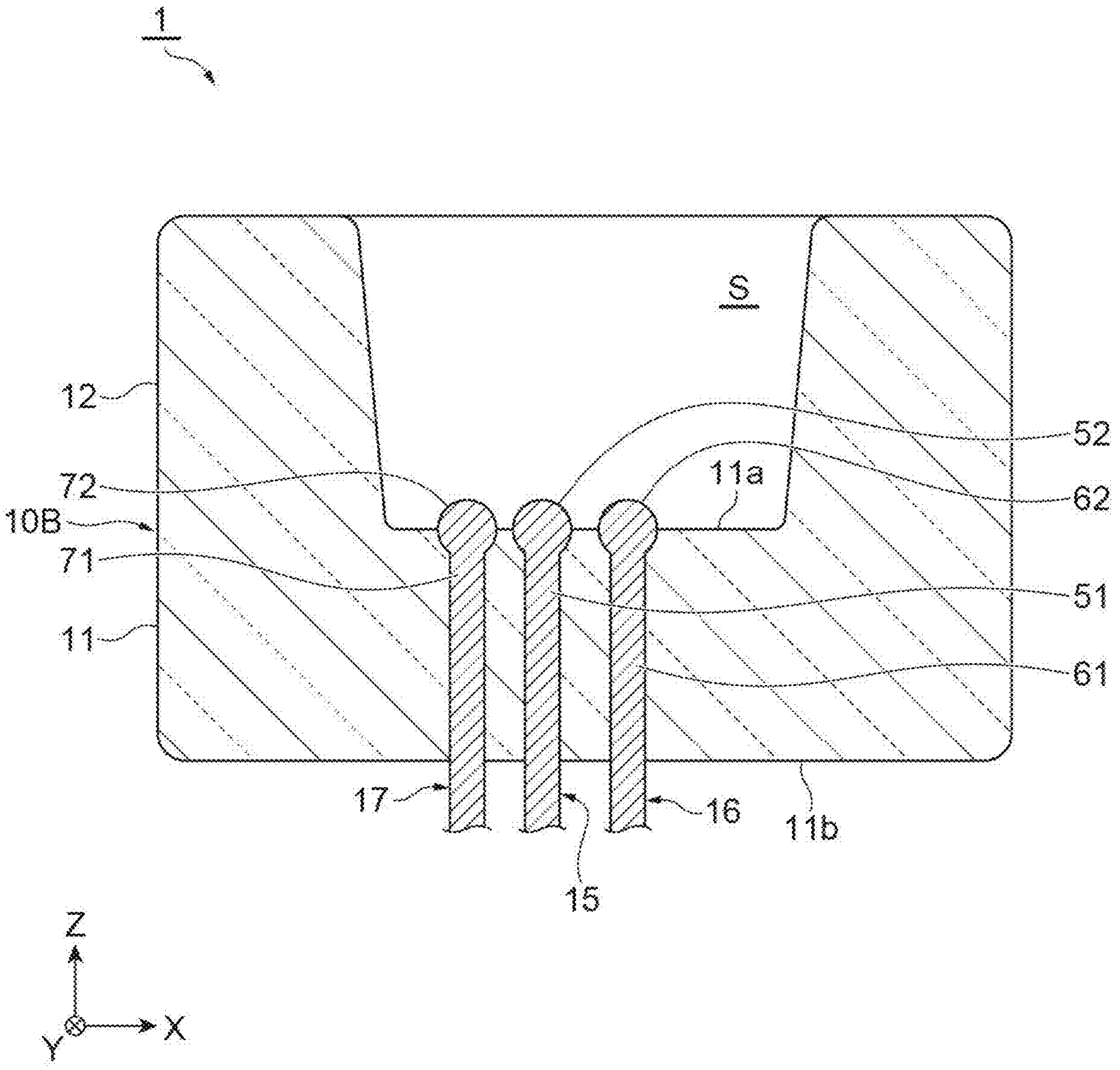
FIG. 2 is a cross-sectional view taken along line II-II of FIG. 1.
Figure 3:
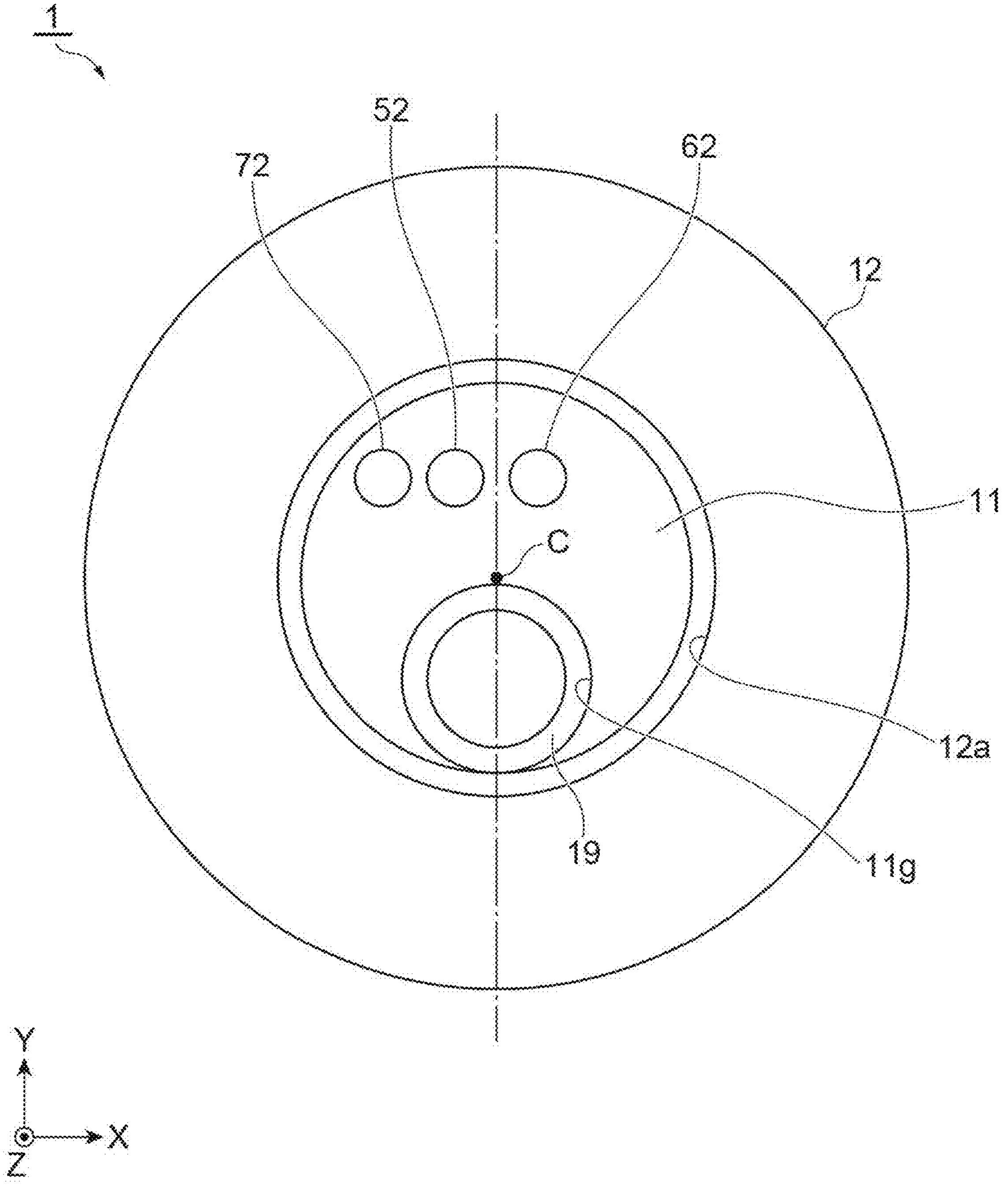
FIG. 3 is a plan view of the flash lamp shown in FIG. 1.

A schematic configuration of a flash lamp according to an embodiment will be described with reference to FIGS. 1 to 3. FIG. 1 is a perspective view of a flash lamp according to an embodiment. FIG. 2 is a cross-sectional view taken along line II-II of FIG. 1. FIG. 3 is a plan view of the flash lamp shown in FIG. 1. A flash lamp 1 shown in FIGS. 1 to 3 is a lamp which emits a large amount of light in an extremely short period of time, and is, for example, a lamp in which a rare gas is enclosed as a discharge gas. More specifically, the flash lamp 1 is, for example, a xenon flash lamp in which xenon is enclosed. The flash lamp 1 includes a valve 10 (housing), a conductive linear member 15 (first conductive linear member), a conductive linear member 16 (second conductive linear member), a conductive linear member 17 (third conductive linear member), and an exhaust pipe 19.

In the present embodiment, the valve 10 is a cylindrical airtight container and basically made of an insulating material (for example, a glass member or a ceramic member).

The valve 10 includes a main body 10B, a face plate 13, and a joint member 14. The valve 10 is formed in a cylindrical shape by stacking the main body 10B and the face plate 13 in the Z direction and joining them by the joint member 14. Specifically, the main body 10B and the face plate 13 are stacked via the joint member 14 so that the central axis of the main body 10B is coaxial with the central axis of the face plate 13. An internal space S is defined by the main body 10B, the joint member 14, and the face plate 13. For convenience of description, the direction from the main body 10B toward the face plate 13, which is a direction in which the components of the valve 10 are stacked, may be referred to as "upward direction" and the direction from the face plate 13 toward the main body 10B may be referred to as "downward direction". In FIGS. 2 and 3, the face plate 13 and the joint member 14 in the configuration of the flash lamp 1 are not shown.

The main body 10B is a cylindrical member whose upper end face is open. The main body 10B is made of an insulating material such as glass (more specifically, borosilicate glass). The main body 10B includes a stem 11 and a side tube 12. The stem 11 and the side tube 12 are integrally molded members.

The stem 11 is a portion that forms a bottom plate of the main body 10B. The stem 11 has a disk-like shape. The thickness of the stem 11 is thicker than the thickness of the face plate 13. The stem 11 has a surface 11*a* (first surface) and a surface 11*b* (second surface). The surface 11*a* is a surface facing the internal space S. The surface 11*b* is a surface opposite to the surface 11*a* in the Z direction (vertical direction).

A through-hole 11*g* is provided in the stem 11. The through-hole 11*g* passes through the stem 11 in the Z direction. The exhaust pipe 19 is inserted into the through-hole 11*g*. Under a heating environment, the exhaust pipe 19 is fused and fixed in a state of being inserted into the through-hole 11*g*, so that the through-hole 11*g* is hermetically sealed. The conductive linear members 15 to 17 is inserted into through the stem 11 in the Z direction. The conductive linear members 15 to 17 are arranged in the order of the conductive linear member 17, the conductive linear member 15, and the conductive linear member 16 in the X direction.

Figure 4:
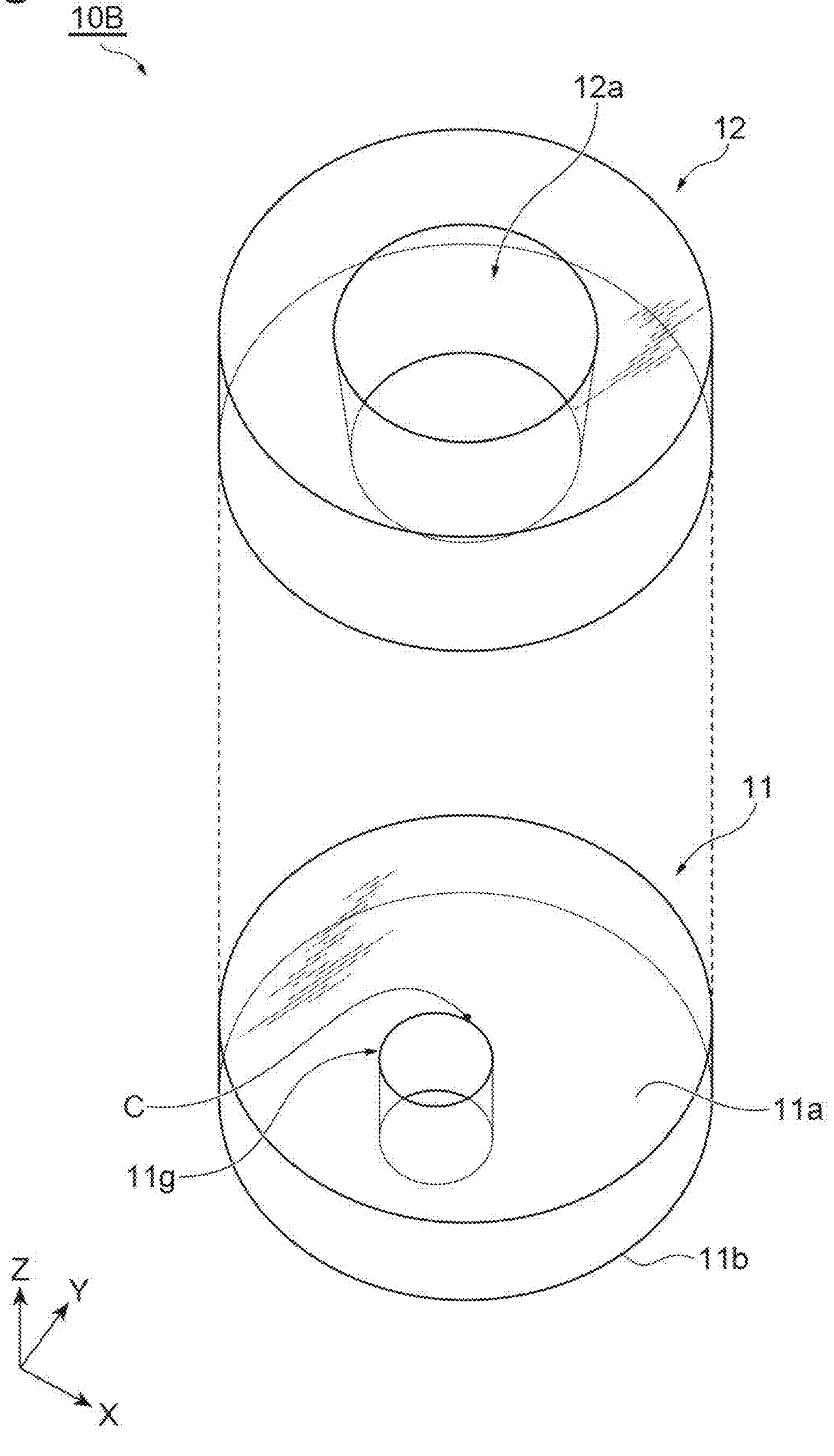
FIG. 4 is a view schematically showing a main body separated into a side tube and a stem before conductive linear members are attached to the main body.

Reference is now further made to FIG. 4. FIG. 4 is a view schematically showing the main body 10B separated into the side tube 12 and the stem 11 before the conductive linear members 15 to 17 are attached to the main body 10B. As described above, the stem 11 and the side tube 12 are integrally molded with each other, but in FIG. 4, for convenience of description, the main body 10B is shown in a state where the stem 11 and the side tube 12 are separated from each other. Note that the through-holes into which the conductive linear members 15 to 17 are inserted are not provided in the stem 11 before the conductive linear members 15 to 17 are attached to the main body 10B. In the state that the stem 11 is softened under a heating environment, the conductive linear members 15 to 17 are inserted into the stem 11 by pushing the conductive linear members 15 to 17 into the stem 11 from the surface 11*a* to the surface 11*b* of the stem 11. In this state, the conductive linear members 15 to 17 are fused and fixed, so that the gaps between the stem 11 and the conductive linear members 15 to 17 are hermetically sealed.

The distance between the center of the through-hole 11*g* and the center axis of the conductive linear member 15 is longer than the distance between the center of the through-hole 11*g* and the center C of the stem 11. Similarly, the distance between the center of the through-hole 11*g* and the center axis of the conductive linear member 16 is longer than the distance between the center of the through-hole 11*g* and the center C of the stem 11. Similarly, the distance between the center of the through-hole 11*g* and the center axis of the conductive linear member 17 is longer than the distance between the center of the through-hole 11*g* and the center C of the stem 11.

The side tube 12 is a portion having a cylindrical shape in which both ends are open. The side tube 12 is stacked on the stem 11 in the Z direction, and is placed on the surface 11*a* of the stem 11. When viewed from the Z direction, the outer shape of the side tube 12 is substantially the same as the outer shape of the stem 11. A through-hole 12*a* passing through the side tube 12 in the thickness direction is provided in the center portion of the side tube 12. The through-hole 12*a* has a shape such that the diameter of the through-hole 12*a* continuously increases with distance from the stem 11. In other words, the through-hole 12*a* is defined by an inclined surface having a tapered shape whose diameter is continuously reduced downward. The side tube 12 is provided so as to surround a cathode 52, an anode 62 and a sparker portion 72 which will be described later. As described above, since the through-hole 12*a* has a shape such that the diameter of the through-hole 12*a* continuously increases with distance from the stem 11, the volume of the internal space S increases with distance from the stem 11. Thus, when the discharge gas is enclosed in the internal space S from the exhaust pipe 19, more discharge gas can be enclosed in the internal space S than in a container having an internal wall surface extending perpendicularly from the boundary between the side tube 12 and the surface 11*a*. As a result, the life of the flash lamp 1 can be extended.

The face plate 13 is a disc-like shaped light emitting window provided so as to face the stem 11. The face plate 13 is made of an optically transparent material such as glass (more specifically, ultraviolet (UV) optically transparent glass). The face plate 13 is thinner than the stem 11. The face plate 13 is bonded to the upper end face of the main body 10B (side tube 12) via the joint member 14. When viewed from the Z direction, the outer shape of the face plate 13 is substantially the same as the outer shape of the side tube 12. The joint member 14 is sandwiched between the side tube 12 and the face plate 13 in the Z direction. As the joint member 14, for example, an adhesive is used, but other members such as frit glass may be used. When viewed from the Z direction, the outer shape of the region where the joint member 14 is disposed is one size smaller than the outer shape of the face plate 13. The through-hole 12*a* is hermetically sealed by joining the side tube 12 and the face plate 13 together by the joint member 14.

Each of the conductive linear members 15 to 17 is a member extending linearly in the Z direction so as to penetrate the stem 11. Each of the conductive linear members 15 to 17 is formed of a conductive material obtained by mixing an electron easily-emissive material into a conductive base material. As the conductive base material, a refractory metal such as molybdenum or tungsten is used. As the electron easily-emissive material, one or more of oxides of lanthanum, yttrium, zirconium, barium, scandium, strontium, neodymium, samarium, calcium, hafnium, and the like are used. For example, when glass is used as the stem 11, molybdenum may be used as the base material for the conductive linear members 15 to 17 from the viewpoint of the thermal expansion coefficient. As a more specific example, lanthanum molybdenum, which is an alloy of molybdenum as the base material and lanthanum oxide as the electron easily-emissive material, may be used.

Figure 5:
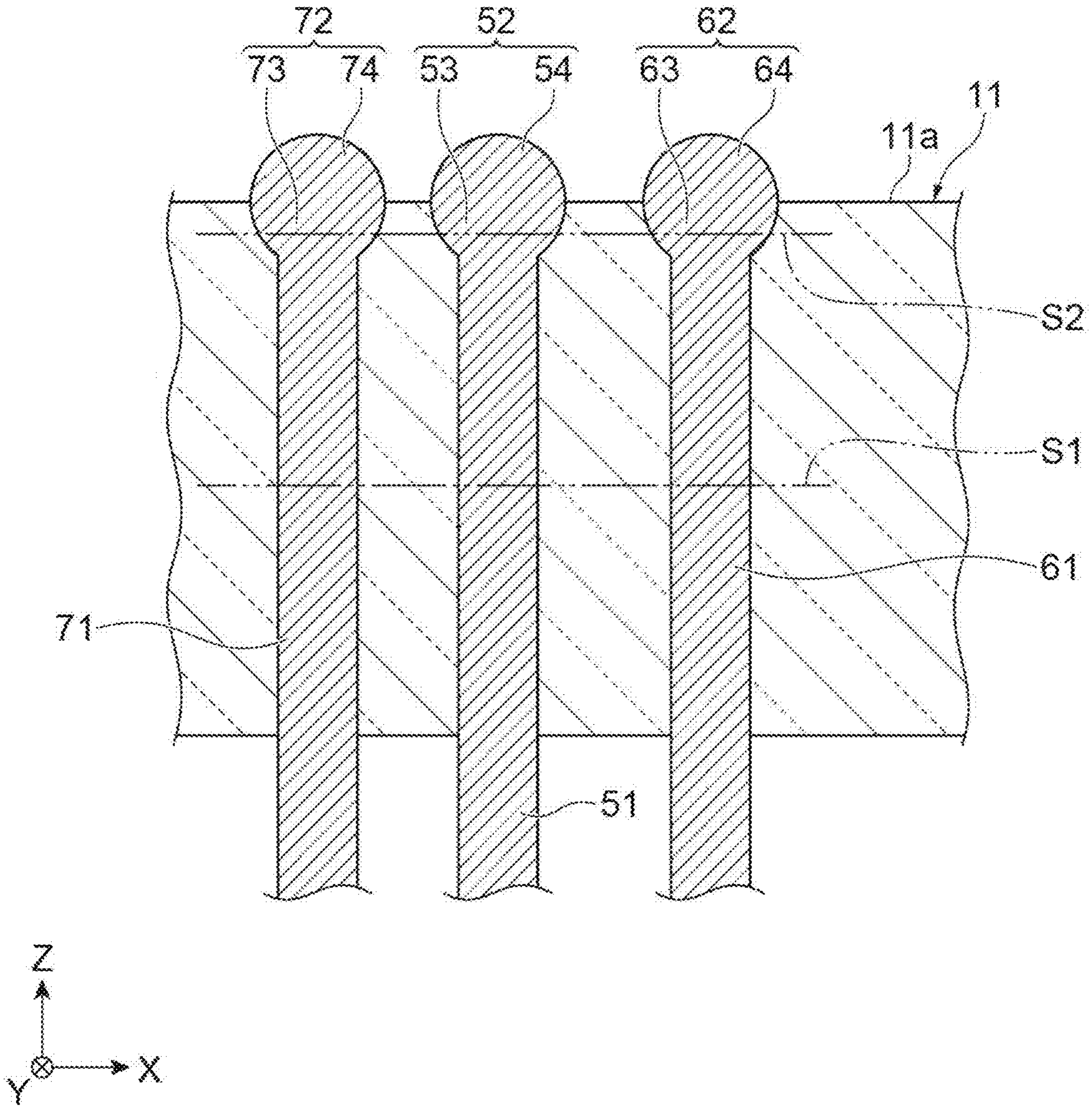
FIG. 5 is a partially enlarged view of FIG. 2.
Figure 6:
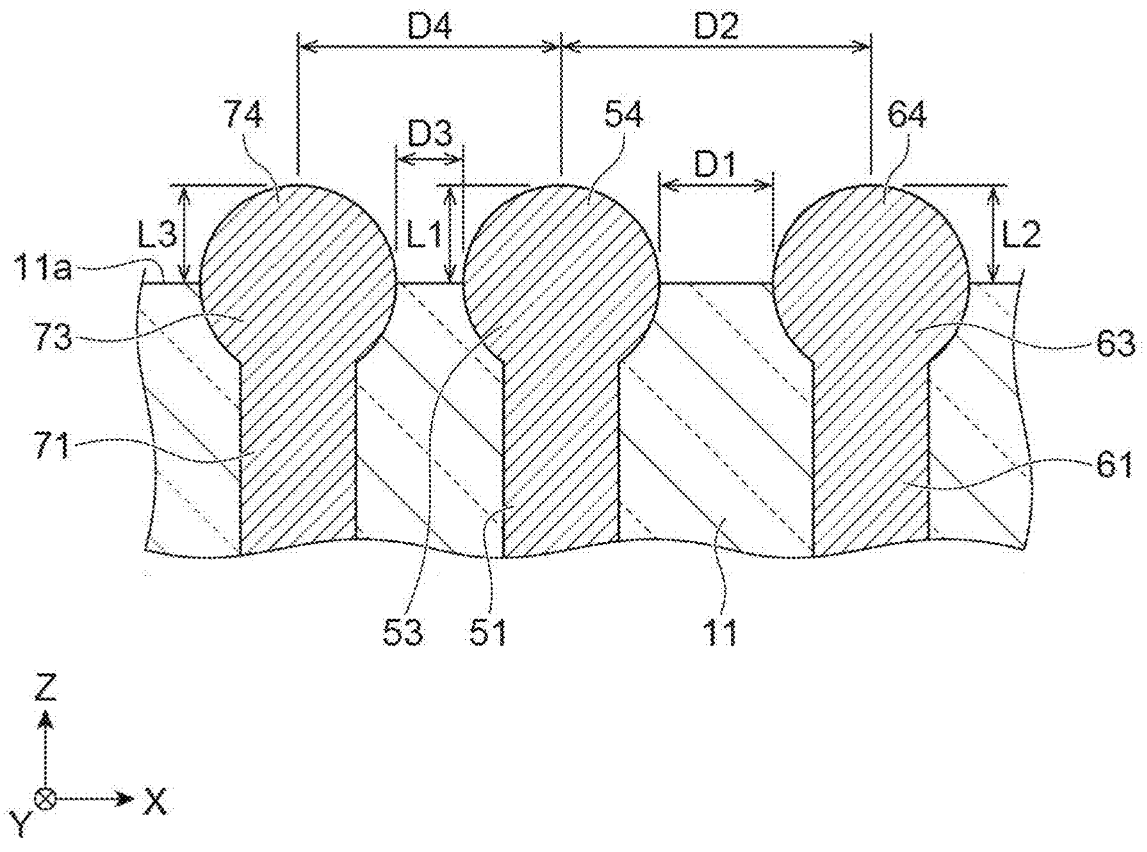
FIG. 6 is a partially enlarged view of FIG. 5.

The conductive linear members 15 to 17 will now be described in detail with further reference to FIGS. 5 and 6. FIG. 5 is a partially enlarged view of FIG. 2. FIG. 6 is a partially enlarged view of FIG. 5. As shown in FIGS. 5 and 6, the conductive linear member 15 includes a lead portion 51 (first lead portion) and a cathode 52 (first electrode portion). The lead portion 51 and the cathode 52 may be integrally molded members or may be separate bodies.

The lead portion 51 is a member for fixing the cathode 52 at a desired position in the internal space S and for supplying electric power to the cathode 52. The lead portion 51 has a linear shape and extends in the Z direction so as to penetrate the stem 11. The lead portion 51 is fused and fixed in a state of being inserted into the stem 11. The lead portion 51 is not exposed in the internal space S, and the entire lead portion 51 is located below the surface 11*a*.

The cathode 52 is also referred to as a cathode portion. The cathode 52 is provided at the tip of the lead portion 51. The cathode 52 has a spherical shape. The cross-sectional area of the cathode 52 in the direction along a plane S2 is different from the cross-sectional area of the lead portion 51 in the direction along a plane S1. Both the plane S1 and the plane S2 are virtual planes extending in a direction intersecting (here, orthogonal to) the Z direction, and the plane S1 and the plane S2 are parallel to each other. In the present embodiment, the above-described cross-sectional area of the cathode 52 is larger than the above-described cross-sectional area of the lead portion 51. In other words, the diameter of the cathode 52 is longer than the diameter of the lead portion 51.

The cathode 52 includes a buried portion 53 (first buried portion) and a protruding portion 54 (first protruding portion). The buried portion 53 is a portion buried in the stem 11. The buried portion 53 is fused and fixed in a state of being buried in the stem 11. The buried portion 53 is connected to the tip of the lead portion 51 in the stem 11. Specifically, the tip of the lead portion 51 is connected to the lower end of the buried portion 53. In the present embodiment, the buried portion 53 has a hemispherical shape. Specifically, the buried portion 53 is a lower half of the cathode 52.

The protruding portion 54 is a portion protruding from the stem 11 (surface 11*a*) into the internal space S. The protruding portion 54 has a shape approaching the protruding portion 64 described later toward the surface 11*a* in the Z direction. In the present embodiment, the protruding portion 54 has a hemispherical shape. Specifically, the protruding portion 54 is an upper half of the cathode 52. The length L1 of the protruding portion 54 in the Z direction is the amount of protrusion of the protruding portion 54 from the surface 11*a* in the Z direction. The length L1 is set to be equal to or shorter than, for example, the length in the Z direction of the discharge path formed between the protruding portion 54 and the protruding portion 64.

In the conductive linear member 15, only the protruding portion 54 is exposed in the internal space S. The boundary between the buried portion 53 and the protruding portion 54 includes the center of the cathode 52 (center point of the sphere). The boundary between the buried portion 53 and the protruding portion 54 is located on the surface 11*a*, and the entire periphery of the boundary is in close contact with the surface 11*a* of the stem 11 without any gap. As a result, the gap between the cathode 52 and the stem 11 is hermetically sealed.

The conductive linear member 16 includes a lead portion 61 (second lead portion) and an anode 62 (second electrode portion). The lead portion 61 and the anode 62 may be integrally molded members or may be separate bodies.

The lead portion 61 is a member for fixing the anode 62 at a desired position in the internal space S and for supplying electric power to the anode 62. The lead portion 61 has a linear shape and extends in the Z direction so as to penetrate the stem 11. The lead portion 61 is fused and fixed in a state of being inserted into the stem 11. The lead portion 61 is not exposed in the internal space S, and the entire lead portion 61 is located below the surface 11*a*.

The anode 62 is also referred to as an anode portion and has an electrical polarity different from that of the cathode 52 due to a difference in polarity of an applied voltage. The anode 62 is provided at the tip of the lead portion 61. The anode 62 has a spherical shape. The cross-sectional area of the anode 62 in the direction along the plane S2 is different from the cross-sectional area of the lead portion 61 in the direction along the plane S1. In the present embodiment, the above-described cross-sectional area of the anode 62 is larger than the above-described cross-sectional area of the lead portion 61. In other words, the diameter of the anode 62 is longer than the diameter of the lead portion 61.

The anode 62 includes a buried portion 63 (second buried portion) and a protruding portion 64 (second protruding portion). The buried portion 63 is a portion buried in the stem 11. The buried portion 63 is fused and fixed in a state of being buried in the stem 11. The buried portion 63 is connected to the tip of the lead portion 61 in the stem 11. Specifically, the tip of the lead portion 61 is connected to the lower end of the buried portion 63. In the present embodiment, the buried portion 63 has a hemispherical shape. Specifically, the buried portion 63 is a lower half of the anode 62.

The protruding portion 64 is a portion protruding from the stem 11 (surface 11*a*) into the internal space S. The protruding portion 64 has a shape approaching the protruding portion 54 toward the surface 11*a* in the Z direction. In the present embodiment, the protruding portion 64 has a hemispherical shape. Specifically, the protruding portion 64 is an upper half of anode 62. The length L2 of the protruding portion 64 in the Z direction is the amount of protrusion of the protruding portion 64 from the surface 11*a* in the Z direction. The length L2 is substantially the same as the length L1, and is set, for example, to be equal to or shorter than the length in the Z direction of the discharge path formed between the protruding portion 54 and the protruding portion 64.

In the conductive linear member 16, only the protruding portion 64 is exposed in the internal space S. The boundary between the buried portion 63 and the protruding portion 64 includes the center of the anode 62 (center point of the sphere). The boundary between the buried portion 63 and the protruding portion 64 is located on the surface 11*a*, and the entire periphery of the boundary is in close contact with the surface 11*a* of the stem 11 without any gap. As a result, the gap between the anode 62 and the stem 11 is hermetically sealed.

The conductive linear member 17 includes a lead portion 71 (third lead portion) and a sparker portion 72. The lead portion 71 and the sparker portion 72 may be integrally molded members or may be separate bodies.

The lead portion 71 is a member for fixing the sparker portion 72 at a desired position in the internal space S and for supplying electric power to the sparker portion 72. The lead portion 71 has a linear shape and extends in the Z direction so as to penetrate the stem 11. The lead portion 71 is fused and fixed in a state of being inserted into the stem 11. The lead portion 71 is not exposed in the internal space S, and the entire lead portion 71 is located below the surface 11*a*.

The sparker portion 72 is provided at the tip of the lead portion 71. The sparker portion 72 has a spherical shape. The cross-sectional area of the sparker portion 72 in the direction along the plane S2 is different from the cross-sectional area of the lead portion 71 in the direction along the plane S1. In the present embodiment, the above-described cross-sectional area of the sparker portion 72 is larger than the above-described cross-sectional area of the lead portion 71. In other words, the diameter of the sparker portion 72 is longer than the diameter of the lead portion 71.

The sparker portion 72 includes a buried portion 73 and a protruding portion 74 (third protruding portion). The buried portion 73 is a portion buried in the stem 11. The buried portion 73 is fused and fixed in a state of being buried in the stem 11. The buried portion 73 is connected to the tip of the lead portion 71 in the stem 11. Specifically, the tip of the lead portion 71 is connected to the lower end of the buried portion 73. In the present embodiment, the buried portion 73 has a hemispherical shape. Specifically, the buried portion 73 is a lower half of the sparker portion 72.

The protruding portion 74 is a portion protruding from the stem 11 (surface 11*a*) into the internal space S. The protruding portion 74 has a shape approaching the protruding portion 54 toward the surface 11*a* in the Z direction. In the present embodiment, the protruding portion 74 has a hemispherical shape. Specifically, the protruding portion 74 is an upper half of the sparker portion 72. The length L3 of the protruding portion 74 in the Z direction is the amount of protrusion of the protruding portion 74 from the surface 11*a* in the Z direction. The length L3 is substantially the same as the length L1 and length L2, and is set, for example, to be equal to or shorter than the length in the Z direction of the discharge path formed between the protruding portion 54 and the protruding portion 64.

In the conductive linear member 17, only the protruding portion 74 is exposed in the internal space S. The boundary between the buried portion 73 and the protruding portion 74 includes the center of the sparker portion 72 (center point of the sphere). The boundary between the buried portion 73 and the protruding portion 74 is located on the surface 11*a*, and the entire periphery of the boundary is in close contact with the surface 11*a* of the stem 11 without any gap. As a result, the gap between the sparker portion 72 and the stem 11 is hermetically sealed.

The protruding portion 54, the protruding portion 64 and the protruding portion 74 are arranged in the X direction in the order of the protruding portion 74, the protruding portion 54 and the protruding portion 64. In other words, the protruding portion 54 is disposed between the protruding portion 74 and the protruding portion 64 in the X direction. Since the protruding portion 54 has a hemispherical shape, the protruding portion 54 approaches the protruding portion 64 and the protruding portion 74 toward the surface 11*a* of the stem 11. Since the boundary between the buried portion 53 and the protruding portion 54 includes the center of the cathode 52 (the center point of the sphere), the protruding portion 54 is closest to the protruding portion 64 and the protruding portion 74 at the boundary between the buried portion 53 and the protruding portion 54 (the portion of the protruding portion 54 in contact with the surface 11*a*).

Similarly, since the protruding portion 64 has a hemispherical shape, the protruding portion 64 approaches the protruding portion 54 toward the surface 11*a* of the stem 11. Since the boundary between the buried portion 63 and the protruding portion 64 includes the center of the anode 62 (center point of the sphere), the protruding portion 64 is closest to the protruding portion 54 at the boundary between the buried portion 63 and the protruding portion 64 (the portion of the protruding portion 64 in contact with the surface 11*a*). Since the protruding portion 74 has a hemispherical shape, the protruding portion 74 approaches the protruding portion 54 toward the surface 11*a* of the stem 11. Since the boundary between the buried portion 73 and the protruding portion 74 includes the center of the sparker portion 72 (the center point of the sphere), the protruding portion 74 is closest to the protruding portion 54 at the boundary between the buried portion 73 and the protruding portion 74 (the portion of the protruding portion 74 in contact with the surface 11*a*).

Therefore, the distance between the protruding portion 54 and the protruding portion 64 in the X direction decreases monotonically from the distance D2 to the distance D1. The distance D1 is a distance in the X direction between the protruding portion 54 and the protruding portion 64 on the surface 11*a* of the stem 11. The distance D2 is a distance in the X direction between the apex of the cathode 52 in the Z direction and the apex of the anode 62 in the Z direction. The distance between the protruding portion 54 and the protruding portion 74 in the X direction decreases monotonically from the distance D4 to the distance D3. The distance D3 is a distance in the X direction between the protruding portion 54 and the protruding portion 74 on the surface 11*a* of the stem 11. The distance D4 is a distance in the X direction between the apex of the cathode 52 in the Z direction and the apex of the sparker portion 72 in the Z direction. The distance D3 is shorter than the distance D1. The distance D4 is shorter than the distance D2.

The exhaust pipe 19 is a metal tubular member for exhausting (vacuuming) the internal space S. The exhaust pipe 19 is made of, for example, Kovar metal. The diameter of the exhaust pipe 19 is longer than the diameter of any of the lead portion 51, the lead portion 61 and the lead portion 71. The exhaust pipe 19 extends in the Z direction so as to penetrate the stem 11. The exhaust pipe 19 is used for exhaust in the internal space S, and then used for enclosing discharge gas in the internal space S. In FIG. 1, the exhaust pipe 19 is shown in a sealed and cut state after being used to enclose the discharge gas, but when used for exhausting gas and enclosing the discharge gas, the exhaust pipe 19 extends further downward.

The exhaust pipe 19 is fused and fixed to the stem 11 in a state of being inserted into the through-hole 11*g* of the stem 11. The tip of the exhaust pipe 19 is disposed substantially flush with the surface 11*a* of the stem 11. The distance between the exhaust pipe 19 and the cathode 52 is longer than the distance between the exhaust pipe 19 and the center C of the surface 11*a*. The distance between the exhaust pipe 19 and the anode 62 is longer than the distance between the exhaust pipe 19 and the center C of the surface 11*a*. The distance between the exhaust pipe 19 and the sparker portion 72 is longer than the distance between the exhaust pipe 19 and the center C of the surface 11*a*. That is, the exhaust pipe 19 is provided in a region opposite to the region where the cathode 52, the anode 62, and the sparker portion 72 are provided with respect to the center C of the surface 11*a*.

In the flash lamp 1, the exhaust pipe 19 is directly or indirectly connected to a device (not shown) such as a vacuum pump, so that exhaust in the internal space S is performed via the exhaust pipe 19. After exhaust, the discharge gas is enclosed in the internal space S through the exhaust pipe 19, so that the flash lamp 1 is brought into a dischargeable state.

Next, the operation of the flash lamp 1 according to the present embodiment will be described with reference to FIG. 1. In the flash lamp 1, first, a predetermined voltage is applied between the protruding portion 54 and the protruding portion 64 by a main power source (not shown) electrically connected to the lead portion 51 and the lead portion 61. In this state, a pulse voltage is applied to the cathode 52, the anode 62 and the sparker portion 72 by a trigger power source (not shown) electrically connected to the lead portion 51, the lead portion 61 and the lead portion 71.

When such a voltage is applied, first, a discharge occurs in the sparker portion 72 and ultraviolet rays (UV light) are emitted. By the emission of the UV light, photoelectrons are emitted from the protruding portion 54 and the protruding portion 64, and the discharge gas in the internal space S is ionized. Following the discharge by the sparker portion 72, a preliminary discharge occurs between the protruding portion 54 and the protruding portion 64. Then, main discharge (arc discharge) occurs between the protruding portion 54 and the protruding portion 64 in the same path as the preliminary discharge. As a result, the flash lamp 1 emits pulse light.

As described above, in the flash lamp 1, the cathode 52 of the conductive linear member 15 is provided at the tip of the lead portion 51, and the tip of the lead portion 51 is connected to the buried portion 53 buried in the stem 11. Therefore, the lead portion 51 is not exposed in the internal space S. Similarly, the anode 62 of the conductive linear member 16 is provided at the tip of the lead portion 61, and the tip of the lead portion 61 is connected to the buried portion 63 buried in the stem 11. Therefore, the lead portion 61 is not exposed in the internal space S. As described above, since neither the lead portion 51 nor the lead portion 61 is exposed in the internal space S, discharge does not occur between the lead portion 51 and the lead portion 61. Therefore, the discharge can be reliably generated between the protruding portion 54 of the cathode 52 and the protruding portion 64 of the anode 62. As a result, fluctuations in the discharge path can be suppressed, and the light output can be stabilized.

The distance between the protruding portion 54 and the protruding portion 64 in the X direction is shortest on the surface 11*a* of the stem 11. Thus, since the distance between the portion of the protruding portion 54 in contact with the surface 11*a* and the portion of the protruding portion 64 in contact with the surface 11*a* is the shortest, the discharge is likely to occur in the direction along the surface 11*a*. As a result, the discharge path is stabilized, so that the light output can be stabilized.

The protruding portion 54 has a shape approaching the protruding portion 64 toward the surface 11*a*. Specifically, the protruding portion 54 has a hemispherical shape. In this configuration, the distance between the protruding portion 54 and the protruding portion 64 in the X direction decreases toward the surface 11*a*. Therefore, the discharge between the protruding portion 54 and the protruding portion 64 is most likely to occur in the direction along the surface 11*a*, and the discharge is less likely to occur in a portion of the protruding portion 54 farther from the stem 11 in the Z direction. Therefore, the discharge path is less likely to fluctuate in the Z direction. As a result, the discharge path is stabilized, so that the light output can be stabilized.

Similarly, the protruding portion 64 has a shape approaching the protruding portion 54 toward the surface 11*a*. Specifically, the protruding portion 64 has a hemispherical shape. In this configuration, the distance between the protruding portion 54 and the protruding portion 64 in the X direction decreases toward the surface 11*a*. Therefore, the discharge between the protruding portion 54 and the protruding portion 64 is most likely to occur in the direction along the surface 11*a*, and the discharge is less likely to occur in a portion of the protruding portion 64 farther from the stem 11 in the Z direction. Therefore, the discharge path is less likely to fluctuate in the Z direction. As a result, the discharge path is stabilized, so that the light output can be stabilized.

Each of the cathode 52, the anode 62, and the sparker portion 72 has a spherical shape. That is, the cathode 52 is a rotating body centered on the axis of the conductive linear member 15. The anode 62 is a rotating body centered on the axis of the conductive linear member 16. The sparker portion 72 is a rotating body centered on the axis of the conductive linear member 17. Therefore, the distance between the cathode 52 and the anode 62 in the X direction and the distance between the cathode 52 and the sparker portion 72 in the X direction are constant regardless of the angle of the rotation direction around the axis of the conductive linear member 15. Therefore, the conductive linear member 15 can be fixed to the stem 11 without considering the angle of the rotational direction around the axis of the conductive linear member 15. Similarly, the conductive linear member 16 can be fixed to the stem 11 without considering the angle of the rotational direction around the axis of the conductive linear member 16. The conductive linear member 17 can be fixed to the stem 11 without considering the angle of the rotational direction around the axis of the conductive linear member 17. Therefore, the arrangement of the cathode 52, the anode 62 and the sparker portion 72 can be simplified.

Since the discharge occurs between the protruding portion 54 and the protruding portion 64, the range in which the discharge can occur in the Z direction is limited by the length of the protruding portion 54 in the Z direction and the length of the protruding portion 64 in the Z direction. The length L1 of the protruding portion 54 in the Z direction is equal to or shorter than the length of the discharge path formed between the protruding portion 54 and the protruding portion 64 in the Z direction. The length L2 of the protruding portion 64 in the Z direction is equal to or shorter than the length of the discharge path in the Z direction. This configuration makes it possible to suppress fluctuation of the discharge path in the Z direction in the protruding portion 54 and the protruding portion 64. As a result, the discharge path is stabilized, so that the light output can be stabilized.

In the flash lamp 1, the protruding portion 54 is disposed between the protruding portion 64 and the protruding portion 74 in the X direction. As a result, the preliminary discharge is performed between the protruding portion 74 and the protruding portion 54, so that the discharge can be stably performed between the protruding portion 54 and the protruding portion 64.

The distance D3 is shorter than the distance D1. Therefore, the preliminary discharge between the protruding portion 54 and the protruding portion 74 is likely to occur earlier than the discharge between the protruding portion 54 and the protruding portion 64. As a result, the discharge can be stably performed between the protruding portion 54 and the protruding portion 64.

Figure 7:
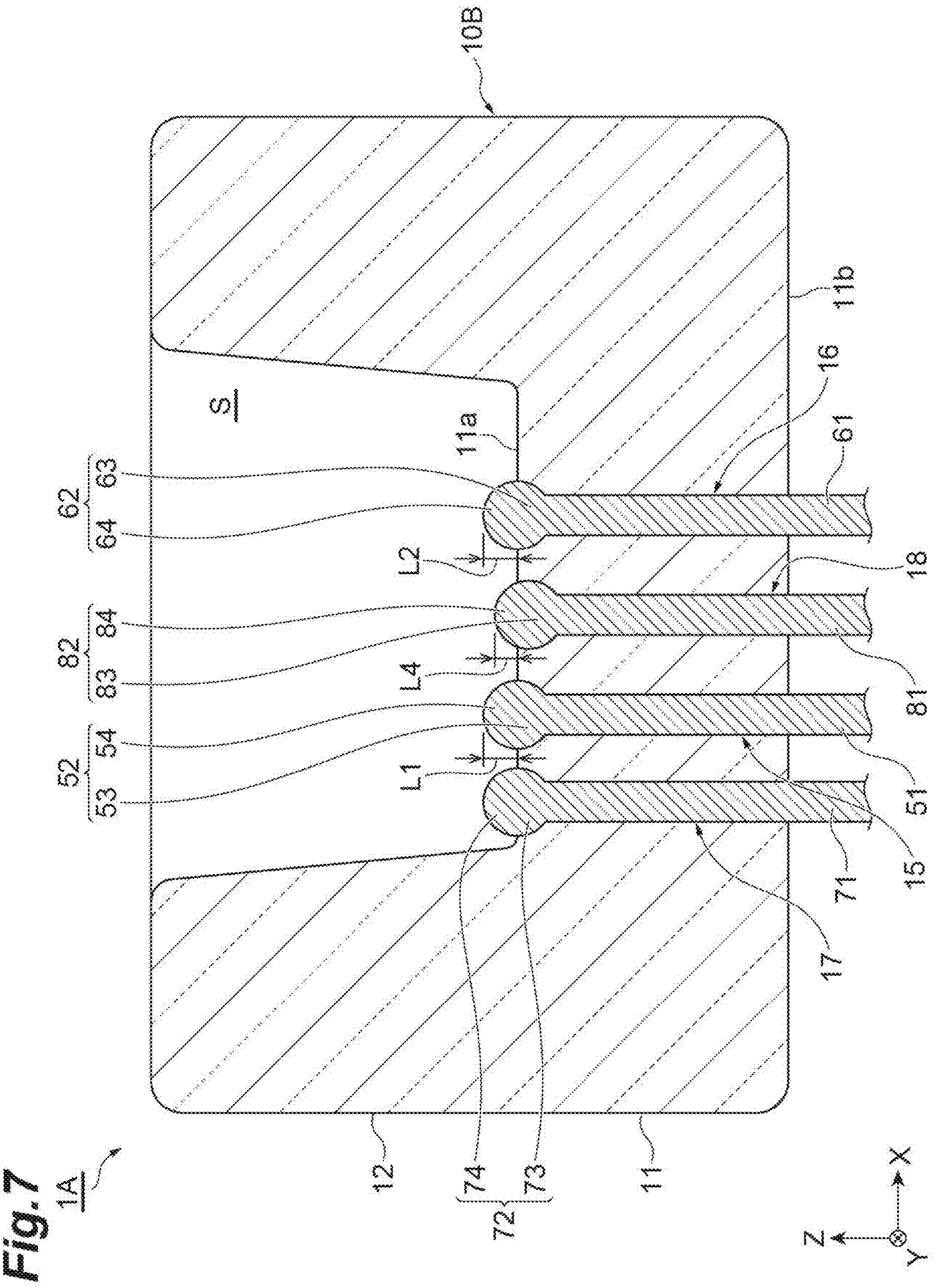
FIG. 7 is a cross-sectional view of a flash lamp according to another embodiment.

Next, a schematic configuration of a flash lamp according to another embodiment will be described with reference to FIG. 7. FIG. 7 is a cross-sectional view of a flash lamp according to another embodiment. As shown in FIG. 7, a flash lamp 1A is mainly different from the flash lamp 1 in that the flash lamp 1A further includes a conductive linear member 18 (fourth conductive linear member).

The conductive linear member 18 is a member extending linearly in the Z direction so as to penetrate the stem 11. As with the conductive linear members 15 to 17, the conductive linear member 18 is formed of a conductive material obtained by mixing an electron easily-emissive material into a conductive base material. Since the same conductive material as the conductive linear members 15 to 17 can be used as the conductive material, a detailed description thereof will be omitted here. Note that the through-hole into which the conductive linear member 18 is inserted is not provided in the stem 11 before the conductive linear member 18 is attached to the main body 10B. In the state that the stem 11 is softened under a heating environment, the conductive linear member 18 is inserted into the stem 11 by pushing the conductive linear member 18 into the stem 11 from the surface 11*a* of the stem 11 toward the surface 11*b*. In this state, the conductive linear member 18 is fused and fixed, so that the gap between the stem 11 and the conductive linear member 18 is hermetically sealed.

The conductive linear member 18 includes a lead portion 81 (fourth lead portion) and a trigger probe portion 82. The lead portion 81 and the trigger probe portion 82 may be integrally molded members or may be separate bodies.

The lead portion 81 is a member for fixing the trigger probe portion 82 at a desired position in the internal space S and for supplying electric power to the trigger probe portion 82. The lead portion 81 has a linear shape and extends in the Z direction so as to penetrate the stem 11. The lead portion 81 is fused and fixed in a state of being inserted into the stem 11. The lead portion 81 is not exposed in the internal space S, and the entire lead portion 81 is located below the surface 11*a*.

The trigger probe portion 82 is provided at the tip of the lead portion 81. The trigger probe portion 82 has a spherical shape. The cross-sectional area of the trigger probe portion 82 in the direction along the plane S2 (see FIG. 5) is different from the cross-sectional area of the lead portion 81 in the direction along the plane S1 (see FIG. 5). In the present embodiment, the above-described cross-sectional area of the trigger probe portion 82 is larger than the above-described cross-sectional area of the lead portion 81. In other words, the diameter of the trigger probe portion 82 is longer than the diameter of the lead portion 81.

The trigger probe portion 82 includes a buried portion 83 and a protruding portion 84 (fourth protruding portion). The buried portion 83 is a portion buried in the stem 11. The buried portion 83 is fused and fixed in a state of being buried in the stem 11. The buried portion 83 is connected to the tip of the lead portion 81 in the stem 11. Specifically, the tip of the lead portion 81 is connected to the lower end of the buried portion 83. In the present embodiment, the buried portion 83 has a hemispherical shape. Specifically, the center of the trigger probe portion 82 is included in the buried portion 83. That is, the buried portion 83 is at least a lower half of the length of the trigger probe portion 82 in the Z direction.

The protruding portion 84 is a portion protruding from the stem 11 (surface 11*a*) into the internal space S. The protruding portion 84 has a shape approaching the protruding portion 54 and the protruding portion 64 toward the surface 11*a* in the Z direction. In the present embodiment, the protruding portion 84 has a hemispherical shape. Specifically, the protruding portion 84 is a portion of the trigger probe portion 82 other than the buried portion 83. The length L4 of the protruding portion 84 in the Z direction is the amount of protrusion of the protruding portion 84 from the surface 11*a* in the Z direction. The length L4 is shorter than any of the length L1 and length L2. The length L4 may be the same as the length L1 and the length L2.

In the conductive linear member 18, only the protruding portion 84 is exposed in the internal space S. The boundary between the buried portion 83 and the protruding portion 84 is located above the center of the trigger probe portion 82. The boundary between the buried portion 83 and the protruding portion 84 is located on the surface 11*a*, and the entire periphery of the boundary is in close contact with the surface 11*a* of the stem 11 without any gap. As a result, the gap between the trigger probe portion 82 and the stem 11 is hermetically sealed.

The protruding portion 54, the protruding portion 64, the protruding portion 74 and the protruding portion 84 are arranged in the X direction in the order of the protruding portion 74, the protruding portion 54, the protruding portion 84 and the protruding portion 64. In other words, the protruding portion 84 is disposed between the protruding portion 54 and the protruding portion 64 in the X direction. Since the protruding portion 84 has a hemispherical shape, the protruding portion 84 approaches the protruding portion 54 and the protruding portion 64 toward the surface 11*a* of the stem 11. Therefore, at the boundary between the buried portion 83 and the protruding portion 84 (the portion of the protruding portion 84 in contact with the surface 11*a*), the protruding portion 84 is closest to the protruding portion 54 and the protruding portion 64.

Next, the operation of the flash lamp 1A will be described. First, a predetermined voltage is applied between the protruding portion 54 and the protruding portion 64 by a main power source (not shown) electrically connected to the lead portion 51 and the lead portion 61. In this state, a pulse voltage is applied to the cathode 52, the anode 62, the sparker portion 72, and the trigger probe portion 82 by a trigger power source (not shown) electrically connected to the lead portion 51, the lead portion 61, the lead portion 71, and the lead portion 81.

When such a voltage is applied, first, a discharge occurs in the sparker portion 72 and ultraviolet rays (UV light) are emitted. By the emission of the UV light, photoelectrons are emitted from the protruding portion 54, the protruding portion 64 and the protruding portion 84, and the discharge gas in the internal space S is ionized. Following the discharge by the sparker portion 72, preliminary discharges occur between the protruding portion 54 and the protruding portion 84 and between the protruding portion 84 and the protruding portion 64. Then, main discharge (arc discharge) occurs between the protruding portion 54 and the protruding portion 64 in the same path as the preliminary discharges. As a result, the flash lamp 1A emits pulse light.

In the flash lamp 1A described above, the same effects as those of the flash lamp 1 are obtained in the configuration common to the flash lamp 1. Further, in the flash lamp 1A, the protruding portion 84 is disposed between the protruding portion 54 and the protruding portion 64 in the X direction. In this case, the preliminary discharges occur between the protruding portion 54 and the protruding portion 84 and between the protruding portion 84 and the protruding portion 64. Then, the main discharge occurs between the protruding portion 54 and the protruding portion 64 in the same discharge path as that of the preliminary discharges. As a result, the discharge path is stabilized, so that the light output can be stabilized.

The length L4 is equal to or shorter than any of the length L1 and the length L2. In this case, the fluctuation of the discharge path in the Z direction can be suppressed when the discharge occurs between the protruding portion 54 and the protruding portion 84. Similarly, the fluctuation of the discharge path in the Z direction can be suppressed when the discharge occurs between the protruding portion 64 and the protruding portion 84. As a result, the discharge path is stabilized, so that the light output can be stabilized.

Although some embodiments of the present disclosure have been described above, the present disclosure is not limited to the above-described embodiments.

In the flash lamps 1 and 1A, the conductive linear member 15 does not have to be an integrally molded member. That is, the lead portion 51 and the cathode 52 are separate members, and may be fixed in the process of manufacturing the flash lamp 1. Similarly, the conductive linear member 16, the conductive linear member 17 and the conductive linear member 18 do not have to be an integrally molded member.

In the flash lamp 1A, one or more other conductive linear members including a trigger probe portion may be further provided depending on the distance D1. For example, as the distance D1 increases, the number of conductive linear members including a trigger probe portion provided between the protruding portion 54 and protruding portion 64 increases. As a result, even if the distance D1 becomes long, the preliminary discharge utilizing the plurality of trigger probe portions can be generated, so that the discharge path can be stabilized.

Figure 8:
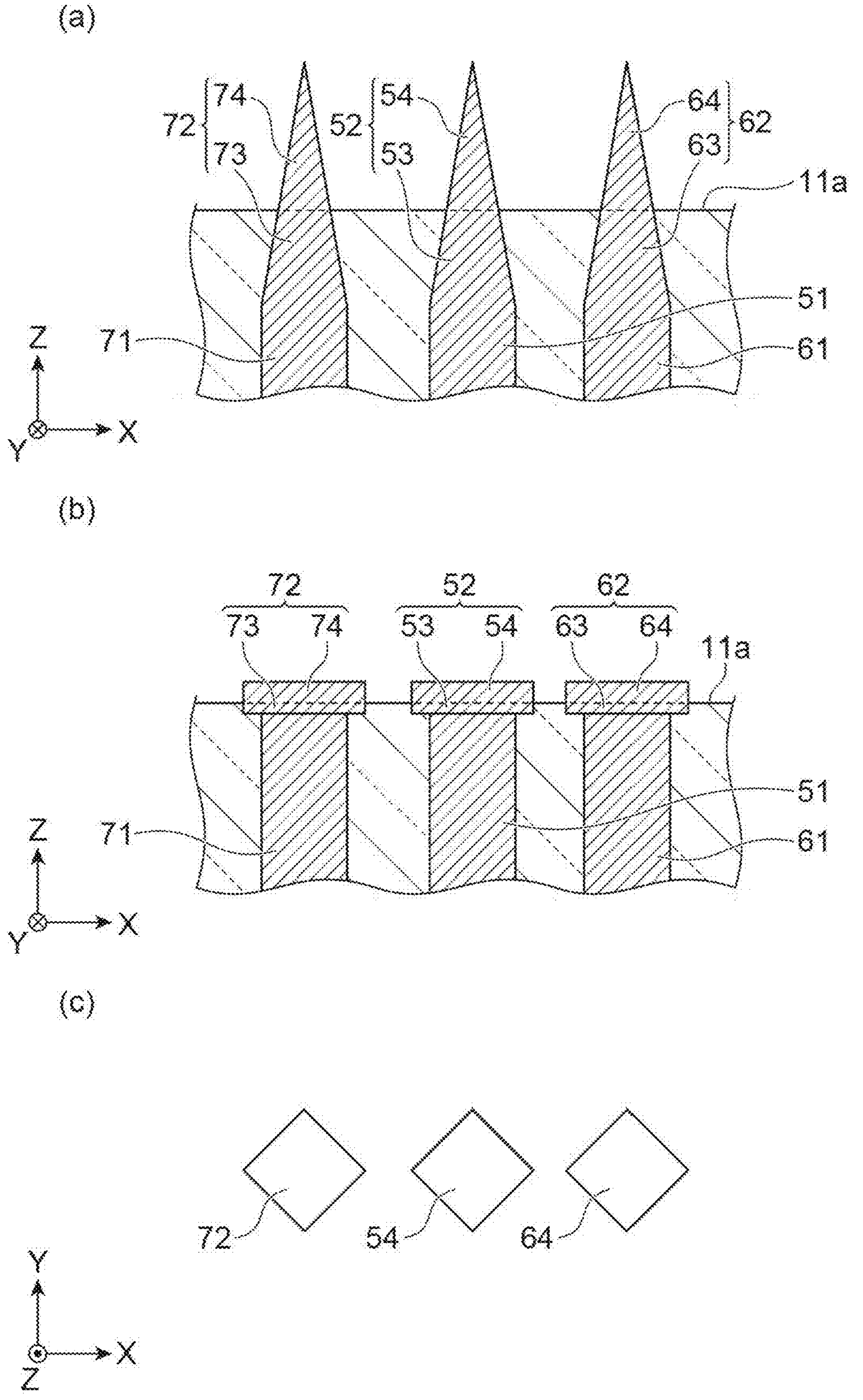
FIGS. 8(*a*) and 8(*b*) are cross-sectional views of a modified example of the conductive linear member shown in FIG. 1.

In the flash lamp 1, each of the cathode 52, the anode 62, and the sparker portion 72 has a spherical shape, but the shapes of the cathode 52, the anode 62, and the sparker portion 72 are not limited to a spherical shape. For example, as shown in FIG. 8(*a*), the cathode 52, the anode 62, and the sparker portion 72 may have a conical shape. Also in this case, the cathode 52 is a rotating body centered on the axis of the conductive linear member 15, the anode 62 is a rotating body centered on the axis of the conductive linear member 16, and the sparker portion 72 is a rotating body centered on the axis of the conductive linear member 17. Therefore, the distance between the cathode 52 and the anode 62 in the X direction and the distance between the cathode 52 and the sparker portion 72 in the X direction are constant regardless of the angle of the rotation direction around the axis of the conductive linear member 15. Therefore, the conductive linear member 15 can be fixed to the stem 11 without considering the angle of the rotational direction around the axis of the conductive linear member 15. Similarly, the conductive linear member 16 can be fixed to the stem 11 without considering the angle of the rotational direction around the axis of the conductive linear member 16. The conductive linear member 17 can be fixed to the stem 11 without considering the angle of the rotational direction around the axis of the conductive linear member 17. Therefore, the arrangement of the cathode 52, the anode 62 and the sparker portion 72 can be simplified.

As shown in FIGS. 8(*b*) and 8(*c*), the cathode 52, the anode 62, and the sparker portion 72 may have a rectangular flat plate shape. The cathode 52, the anode 62, and the sparker portion 72 may be arranged in the X direction such that one corner of the cathode 52 and one corner of the anode 62 face each other, and another corner of the cathode 52 and one corner of the sparker portion 72 face each other. In this configuration, since the discharge path is formed between the corners facing each other in the X direction, the fluctuation of the discharge path in the Y direction can be suppressed. As a result, the discharge path is stabilized, so that the light output can be stabilized.

Figure 9:
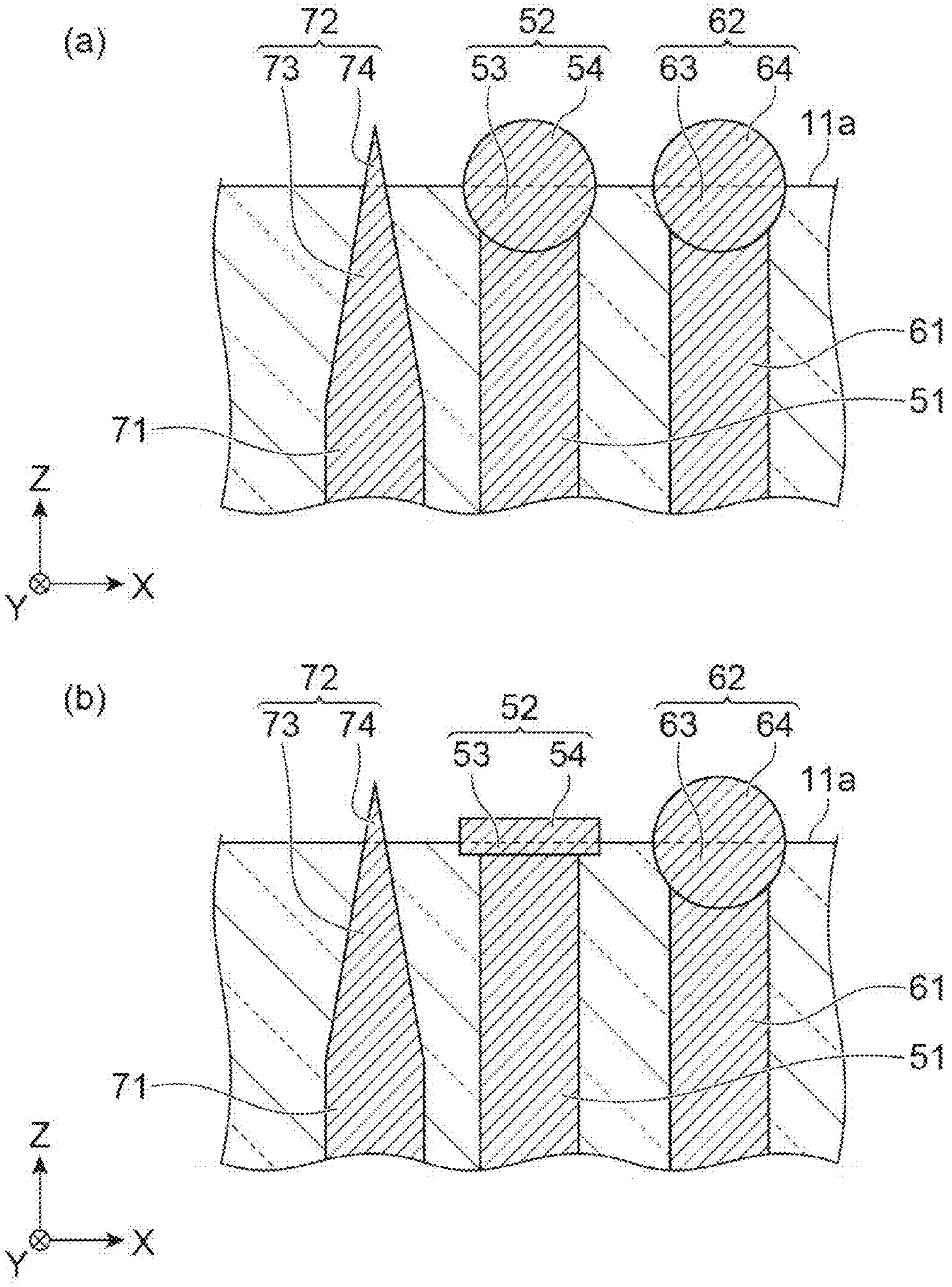
FIGS. 9(*a*) and 9(*b*) are cross-sectional views of another modified example of the conductive linear member shown in FIG. 1.

In the flash lamp 1, the cathode 52, the anode 62, and the sparker portion 72 have the same (spherical) shape, but may have shapes different from each other. For example, as shown in FIG. 9(*a*), the shapes of the cathode 52 and the anode 62 may be the same, and the shape of the sparker portion 72 may be different from the shapes of the cathode 52 and the anode 62. In the example shown in FIG. 9(*a*), the cathode 52 and the anode 62 have a spherical shape, and the sparker portion 72 has a conical shape.

As shown in FIG. 9(*b*), the shapes of the cathode 52, the anode 62, and the sparker portion 72 may be different from each other. In the example shown in FIG. 9(*b*), the cathode 52 has a rectangular flat plate shape, the anode 62 has a spherical shape, and the sparker portion 72 has a conical shape. The cathode 52, the anode 62 and the sparker portion 72 may have any shape.

Figure 10:
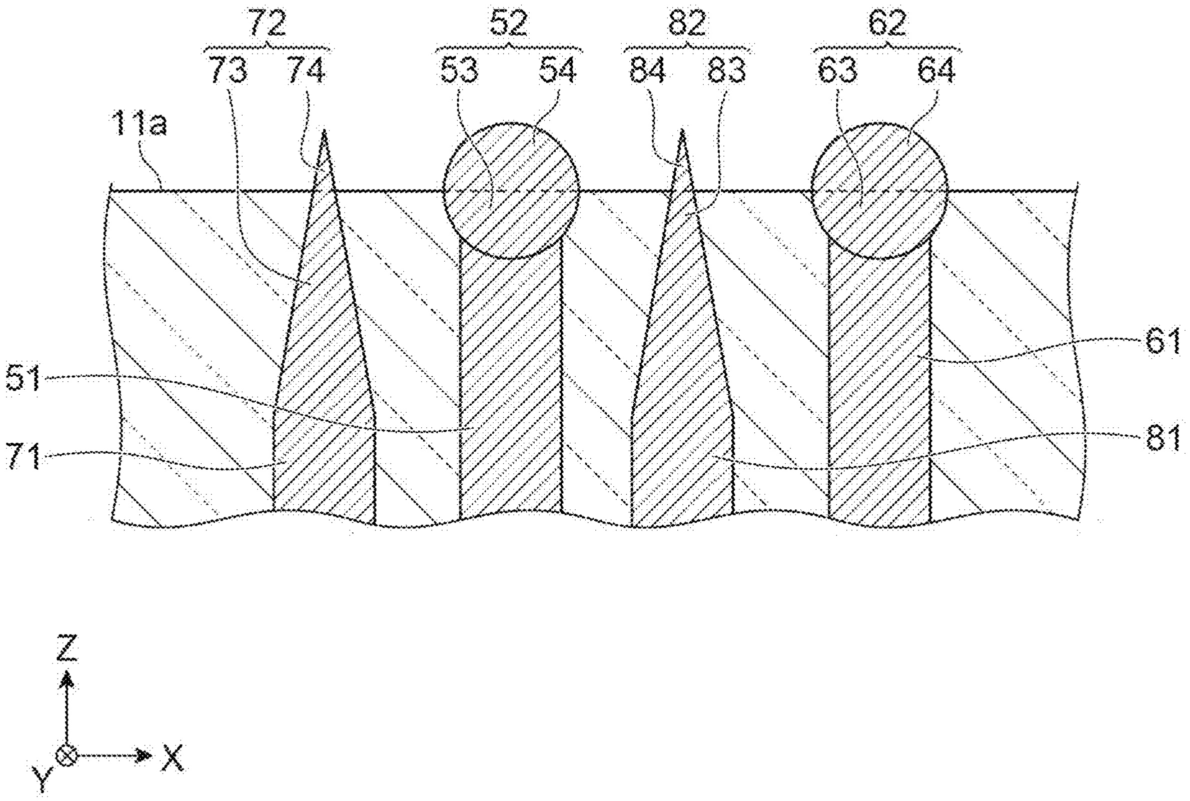
FIG. 10 is a view showing a modified example of the conductive linear member shown in FIG. 7.

Similarly, in the flash lamp 1A, the cathode 52, the anode 62, the sparker portion 72, and the trigger probe portion 82 have the same (spherical) shape, but may have shapes different from each other. As shown in FIG. 10, the shapes of the cathode 52 and the anode 62 may be the same, and the shapes of the sparker portion 72 and the trigger probe portion 82 may be different from the shapes of the cathode 52 and the anode 62. In the example shown in FIG. 10, the cathode 52 and the anode 62 have a spherical shape, and the sparker portion 72 and the trigger probe portion 82 have a conical shape.

Further, the shapes of the cathode 52, the anode 62, the sparker portion 72, and the trigger probe portion 82 may be different from each other. Three electrode portions of the cathode 52, the anode 62, the sparker portion 72, and trigger probe portion 82 may have the same shape, and the other electrode portion may have a different shape. Two electrode portions of the cathode 52, the anode 62, the sparker portion 72, and the trigger probe portion 82 may have the same shape, one electrode portion may have a shape different from the shapes of the two electrode portions, and the other electrode portion may have yet another shape.

The flash lamps 1 and 1A do not have to include the conductive linear member 17. The valve 10 just have to be configured to define the internal space S. For example, the valve 10 may be formed by joining the stem 11 and the side tube 12 which are members different from each other. The side tube 12 is not limited to being made of an insulating material, and may be made of a conductive material such as a metal. The side tube 12 and the face plate 13 may be fused directly to each other, and the valve 10 do not have to include the joint member 14.

In the flash lamps 1 and 1A, the term "spherical" means substantially spherical, and is not limited to a strictly spherical shape, but may be a shape deformed within a range that can be recognized as a spherical shape. Similarly, the term "hemispherical" means substantially hemispherical, and is not limited to a strictly hemispherical shape, but may be a shape deformed within a range that can be recognized as a hemispherical shape. Although the buried portion 53 and the protruding portion 54 have a hemispherical shape, the shapes of the buried portion 53 and the protruding portion 54 are not limited thereto. For example, the center of the cathode 52 may be included in the buried portion 53. That is, half or more of the length of the cathode 52 in the Z direction may be the buried portion 53, and the remaining portion may be the protruding portion 54. The center of the cathode 52 may be included in the protruding portion 54. That is, half or more of the length of the cathode 52 in the Z direction may be the protruding portion 54, and the remaining portion may be the buried portion 53. The same applies to the anode 62, the sparker portion 72, and the trigger probe portion 82.

In the flash lamps 1 and 1A, the stem 11 may have a raised portion which is raised in the internal space S from the surface 11*a*. The buried portion 53 may be buried in the raised portion. The above-described configuration is formed, for example, when the flash lamps 1 and 1A are manufactured, by solidifying the stem 11 in a state in which the stem 11 in a molten state is raised so as to surround a lower portion (a portion corresponding to the buried portion 53) of the cathode 52 located immediately above the surface 11*a*. Similarly, each of the buried portion 63, the buried portion 73 and the buried portion 83 may be buried in a raised portion of the stem 11.

In the flash lamps 1 and 1A, the length L1 and the length L2 may be longer than the length in the Z direction of the discharge path formed between the protruding portion 54 and the protruding portion 64. In this case, the deterioration of the cathode 52 and the anode 62 due to the discharge can be suppressed. The length L1 and the length L2 may be the same as the length of the discharge path in the Z direction. In this case, it is possible to suppress the fluctuation of the discharge path in the Z direction while suppressing the deterioration of the cathode 52 and the anode 62 due to the discharge.

Figure 11:
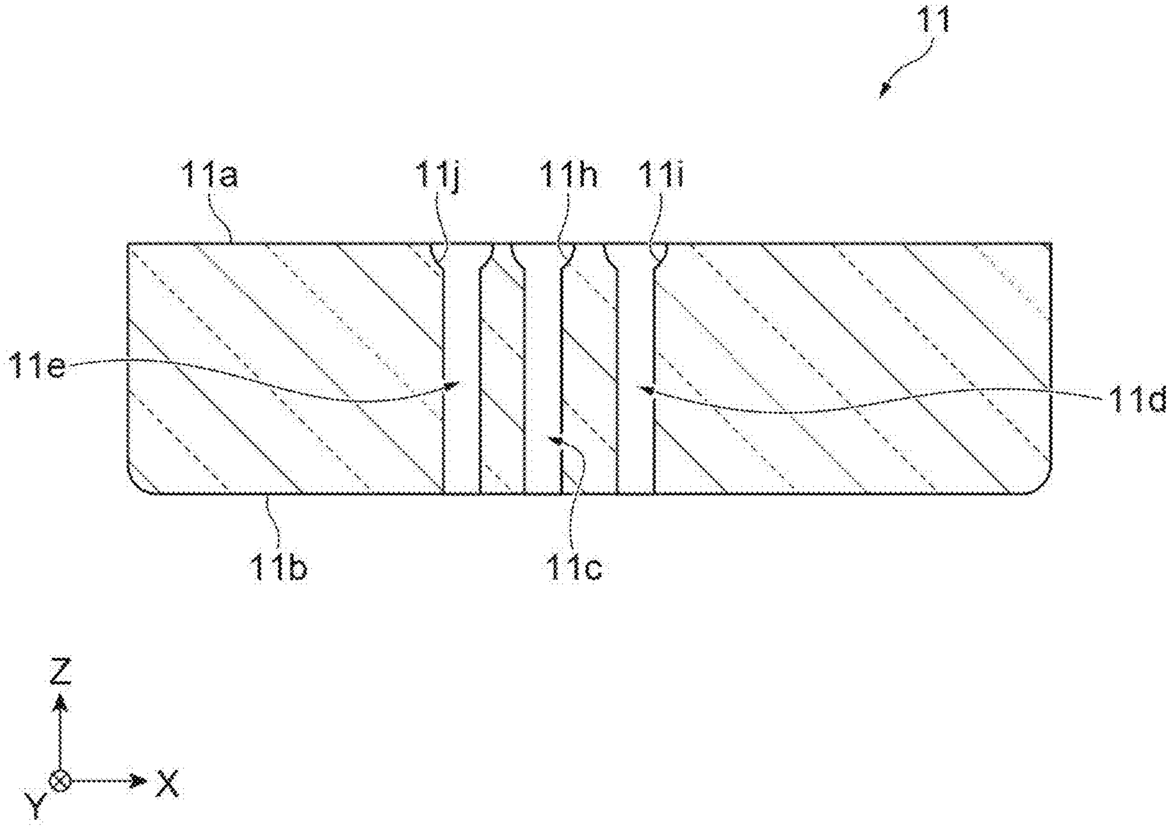
FIG. 11 is a cross-sectional view of a modified example of the stem shown in FIG. 1.

As shown in FIG. 11, in the flash lamp 1, the through-holes 11*c*, 11*d* and 11*e* passing through the stem 11 in the Z direction may be provided in advance in the stem 11 before the conductive linear members 15 to 17 are attached to the main body 10B. In the example shown in FIG. 11, the through-hole 11*c* includes a concave portion 11*h* for accommodating the buried portion 53. The through-hole 11*d* includes a concave portion 11*i* for accommodating the buried portion 63. The through-hole 11*e* includes a concave portion 11*j* for accommodating the buried portion 73. Each of the concave portions 11*h*, 11*i* and 11*j* is recessed from the surface 11*a* toward the surface 11*b*. The concave portions 11*h*, 11*i* and 11*j* have shapes corresponding to the buried portions 53, 63 and 73, respectively.

In the above-described configuration, the through-hole 11*c* is hermetically sealed by fusing the conductive linear member 15 to the stem 11 in a state where the lead portion 51 is inserted into the through-hole 11*c* and the buried portion 53 is fitted in the concave portion 11*h*. Similarly, the through-hole 11*d* is hermetically sealed by fusing the conductive linear member 16 to the stem 11 in a state where the lead portion 61 is inserted into the through-hole 11*d* and the buried portion 63 is fitted in the concave portion 11*i*. Similarly, the through-hole 11*e* is hermetically sealed by fusing the conductive linear member 17 to the stem 11 in a state where the lead portion 71 is inserted into the through-hole 11*e* and the buried portion 73 is fitted in the concave portion 11*j*.

Similarly, in the flash lamp 1A, a through-hole into which inserting the conductive linear member 18 may be provided in advance in addition to the through-holes 11*c*, 11*d* and 11*e* in the stem 11 before the conductive linear members 15 to 18 are attached to the main body 10B.

REFERENCE SIGNS LIST

1,1A: flash lamp, 10: valve (housing), 11: stem, 11*a*: surface (first surface), 11*b*: surface (second surface), 15: conductive linear member (first conductive linear member), 16: conductive linear member (second conductive linear member), 17: conductive linear member (third conductive linear member), 18: conductive linear member (fourth conductive linear member), 51: lead portion (first lead portion), 52: cathode (first electrode portion), 53: buried portion (first buried portion), 54: protruding portion (first protruding portion), 61: lead portion (second lead portion), 62: anode (second electrode portion), 63: buried portion (second buried portion), 64: protruding portion (second protruding portion), 71: lead portion (third lead portion), 72: sparker portion, 74: protruding portion (third protruding portion), 81: lead portion (fourth lead portion), 82: trigger probe portion, 84: protruding portion (fourth protruding portion).

The invention claimed is:

1. A flash lamp comprising:

a housing having a stem and defining an internal space;

a first conductive linear member extending so as to penetrate the stem in a first direction; and a second conductive linear member extending so as to penetrate the stem in the first direction and spaced apart from the first conductive linear member in a second direction intersecting the first direction, wherein the first conductive linear member comprises a first lead portion and a first electrode portion provided at a tip of the first lead portion, wherein the second conductive linear member comprises a second lead portion and a second electrode portion provided at a tip of the second lead portion, wherein a cross-sectional area of the first electrode portion intersecting the first direction is different from a cross-sectional area of the first lead portion intersecting the first direction, wherein a cross-sectional area of the second electrode portion intersecting the first direction is different from a cross-sectional area of the second lead portion intersecting the first direction, wherein the first electrode portion comprises a first protruding electrode portion protruding from the stem into the internal space, and a first buried electrode portion connected to the tip of the first lead portion and buried in the stem, a cross-sectional area of the first buried electrode portion intersecting the first direction is different from a cross-sectional area of the tip of the first lead portion intersecting the first direction, and wherein the second electrode portion comprises a second protruding electrode portion protruding from the stem into the internal space, and a second buried electrode portion connected to the tip of the second lead portion and buried in the stem, a cross-sectional area of the second buried electrode portion intersecting the first direction is different from a cross-sectional area of the tip of the second lead portion intersecting the first direction.

2. The flash lamp according to claim 1, wherein the stem includes a first surface facing the internal space and a second surface opposite to the first surface in the first direction, and wherein a distance between the first protruding electrode portion and the second protruding electrode portion in the second direction is shortest on the first surface.

3. The flash lamp according to claim 2, wherein the first protruding electrode portion has a shape approaching the second protruding electrode portion toward the first surface.

4. The flash lamp according to claim 3, wherein the second protruding portion has a shape approaching the first protruding electrode portion toward the first surface.

5. The flash lamp according to claim 3, wherein the first electrode portion has a spherical shape.

6. The flash lamp according to claim 3, wherein the first electrode portion has a conical shape.

7. The flash lamp according to claim 1, wherein a length of the first protruding electrode portion in the first direction is equal to or shorter than a length in the first direction of a discharge path formed between the first protruding electrode portion and the second protruding portion, and wherein a length of the second protruding electrode portion in the first direction is equal to or shorter than the length of the discharge path in the first direction.

8. The flash lamp according to claim 1, further comprising a third conductive linear member extending so as to penetrate the stem in the first direction, wherein the third conductive linear member comprises a third lead portion and a sparker portion provided at a tip of the third lead portion, wherein the sparker portion comprises a third protruding portion protruding from the stem into the internal space, wherein the first electrode portion is a cathode, and the second electrode portion is an anode, and wherein the first protruding electrode portion is disposed between the second protruding electrode portion and the third protruding portion in the second direction.

9. The flash lamp according to claim 8, wherein a distance between the first protruding electrode portion and the third protruding portion in the second direction is shorter than a distance between the first protruding electrode portion and the second protruding electrode portion in the second direction.

10. The flash lamp according to claim 1, further comprising a fourth conductive linear member extending so as to penetrate the stem in the first direction, wherein the fourth conductive linear member comprises a fourth lead portion and a trigger probe portion provided at a tip of the fourth lead portion, wherein the trigger probe portion comprises a fourth protruding portion protruding from the stem into the internal space, and wherein the fourth protruding portion is disposed between the first protruding electrode portion and the second protruding electrode portion in the second direction.

11. The flash lamp according to claim 10, wherein a length of the fourth protruding portion in the first direction is equal to or shorter than a length of the first protruding electrode portion in the first direction and a length of the second protruding electrode portion in the first direction.

* * * * *